Oct. 12, 1965   H. J. GRZYB   3,210,850
FLEXIBLE STAY LATH MEASURING DEVICE
Filed Feb. 1, 1962
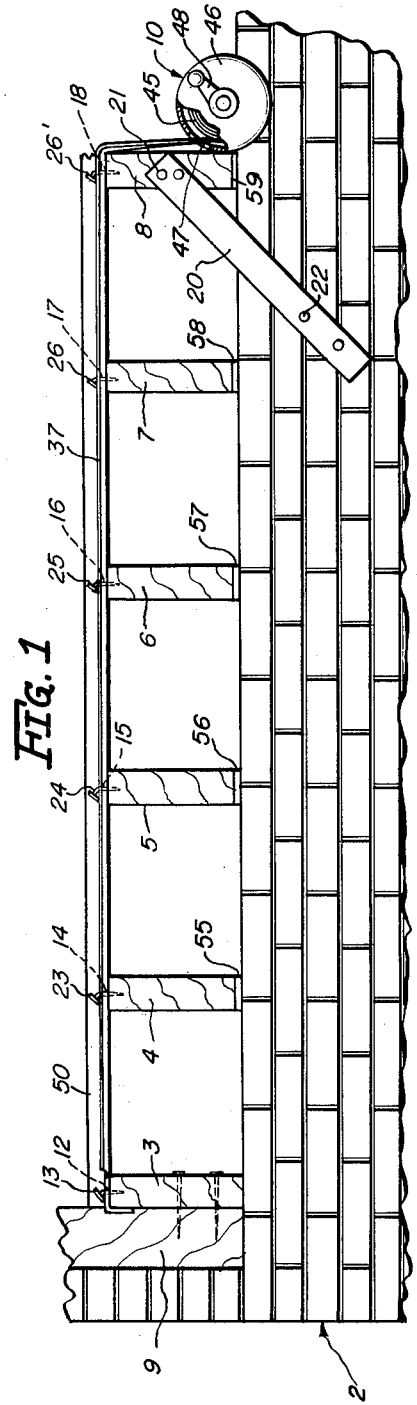
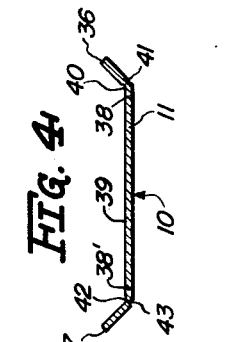
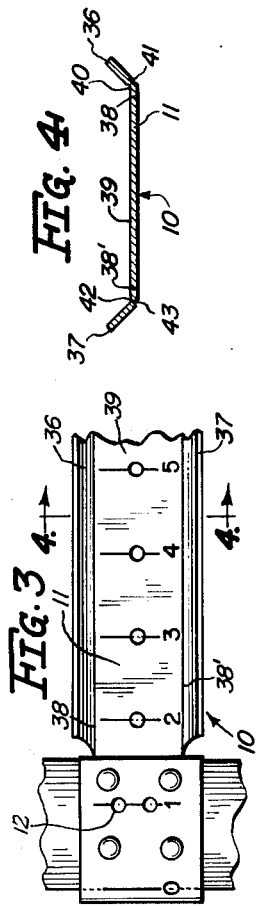
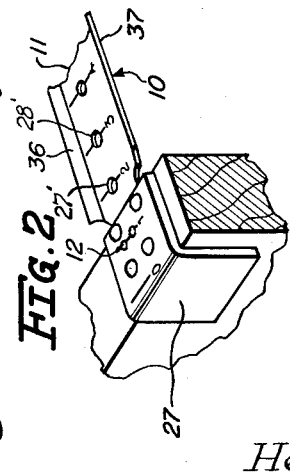
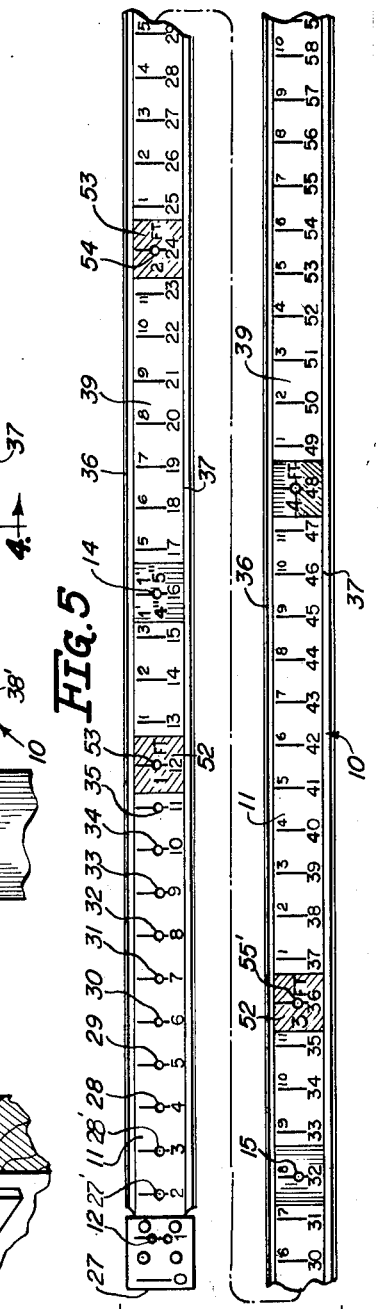
INVENTOR.
Henry J. Grzyb
BY John J. Kowalik
Atty.

United States Patent Office

3,210,850
Patented Oct. 12, 1965

3,210,850
FLEXIBLE STAY LATH MEASURING DEVICE
Henry J. Grzyb, 6421 Lane Court, Hinsdale, Ill.
Filed Feb. 1, 1962, Ser. No. 170,592
1 Claim. (Cl. 33—137)

This invention relates to the building trades and more specifically appertains to a novel stowable stay lath tape which functions in a dual capacity of a temporary support for the building joists as well as a measuring tape for determining the spacing between said joists.

One of the most time consuming and tedious carpentry tasks in building construction is in properly spacing the joists, which in standard constructions usually require a spacing of 16" on centers, and in retaining them at the desired spacing.

It is a general object of the invention to provide a novel stay lath which is flexible and which may be secured to the upper edges of the joists while they are at different levels.

A further object of the invention is to provide a novel combined measuring device and stay lath in the form of the tape with spacing indicia inscribed thereon at regular predetermined increments, the tape having a series of nail holes at desired intervals to provide means for securment of the tape to the joists.

A further object of the invention is to provide a novel stay lath and measuring instrument in which the increments of measurement identifying equal spacings are identified with the same color as for example 16" spacings may be indicated red of the width of a conventional joist and 12" centers may be identified with green color stripes.

Another object of the invention is to provide a stay lath tape with nail holes at appropriate intervals at the leading end of the tape so that the initial end of the tape may be pulled the required number of inches before beginning the count.

These and other objects and advantages inherent in and encompassed by the invention will become more readily apparent from the specification and the drawings, wherein:

FIGURE 1 is an edge view of the invention shown applied to typical construction;

FIGURE 2 is a fragmentary perspective view of the initial end of the tape;

FIGURE 3 is a fragmentary plan view of the initial end of the tape;

FIGURE 4 is a cross-sectional view taken substantially on line 4—4 of FIGURE 3; and FIGURE 5 is a broken apart extensive plan view of the novel tape.

*Description of the invention*

Describing the invention in detail and having particular reference to the drawings there is shown in FIGURE 1 a typical wall structure 2 which provides a foundation for the laterally spaced group of joists 3, 4, 5, 6, 7 and 8. Joist 3 is preferably secured to the end wall structure 9.

The stay lath measuring device 10 forming the subject of the instant invention comprises a steel tape portion 11 extended over the upper edges of the joists and drawn taut between the endmost joists 3 and 8, which in the present instance are separated 80" apart, and the tape is nailed through openings 12 by nails 13 to joist 3 and through opening 18 by nail 26' to joist 8. The joist 8 is secured in upright position by a temporary brace 20 which is nailed at 21 thereto and at 22 to the wall. Nails 13 and 26' are bent over to hold the tape secured.

Thereafter the joists 4 through 7 are properly spaced at 16" intervals and shimmed up level and secured by nails 23, 24, 25 and 26 which are projected through openings 14, 15, 16 and 17 and bent over to hold the tape.

Frequently it is necessary, because of obstructions and the like, to pull several inches at the initial end 27 of the tape. I have provided a plurality of nail holes at 27', 28', 28, 29, 30, 31, 32, 33, 34 and 35 which are respectively located at one inch intervals from 2" through 11".

In order to rigidify the tape I preferably provide a pair of longitudinal stiffening flanges 36 and 37 along the lateral edges 38, 38' of the generally flat center body portion 39. The flanges 36, 37 are grooved at 40, 41 and 42, 43 respectively to enhance the flexibility of the structure in order to accommodate flexure of the flanges to a coplanar position with the body portion of the tape so that the tape may be wound in a roll 45 within the magazine 46 which has a passage slot 47 through which the tape runs. The magazine may have a handle 48 connected to the tape.

After the invention is applied, the flooring 50 is then nailed to the joists whereupon the invention is removed and the tape wound into the case 46.

It will be readily recognized that a novel, compact and effective stay lath measuring device is provided which is adaptable for facile application and removal to the construction material.

An alternative method of using the invention is to secure the initial end 27 of the tape to the joist 3 through any openings 12 or 28 through 35 depending on how much of the initial end is to be pulled. Then joist 4 is secured at the 16" interval of the tape by nailing through opening 14 with nail 23, joist 5 through opening 15 at the 32" interval with nail 24, and joist 6 through opening 16 at the 48" interval with nail 25, then joist 7 through opening 17 at the 64" interval with nail 26. The joist 4 is leveled by shim 55, joist 5 is leveled by shim 56, joist 6 by shim 57, joist 7 by shim 58 and joist 8 by shim 59 and the tape is secured at the 80" interval by nail 26' to joist 8 through opening 18. It will be readily apparent that the instant device greatly facilitates this phase of the construction since the joists may be interconnected without accurately initially spacing them and yet interconnecting the same so that when the tape is drawn taut and the joists leveled the joists will be properly spaced.

The tape may have twelve inch intervals identified with green wide stripes 52 and at 48" with green and red bars. Securing apertures 53, 54, 55', etc., may be provided.

The 16" intervals may be identified by red stripes, which, as the green stripes, is the width of a typical 2" joist. It will be understood that the 1 ft., 2 ft. and 3 ft. marks will be green and those which correspond with the 16" intervals will be identified by both red and green colors, such as at 4 ft. The stay lath tape is thus a precision tool affording a high degree of measurement accuracy particularly in use when applying 4' x 8" dimension plywood which is dimensionally very accurate.

Although the drawings show an 80" span, it will be realized that the flooring may be of any length such as for example 96" which would accommodate two lengths of 4' x 8' floor plywood. The structure, of course, is optional and according to given specifications.

A further feature of this invention is that in having a flexible stay lath, the possibility of the members joined by the lath from separating and collapsing is entirely eliminated inasmuch the novel stay lath of this invention having sufficient length will be fixedly anchored at opposite ends of any given length to rigid ports of the construction which is not feasible with the temporary short length braces as used in current construction practices.

Having described a preferred form of the invention, it will be realized that various forms of the device will now become readily apparent to those skilled in the art and that it is intended to cover such variations within the scope of the appended claim.

I claim:

A stay lath for securing building beams in a prearranged pattern comprising a flexible metallic tape having a plurality of equally spaced measuring increments inscribed thereon, and identifying color indicia at predetermined equal intervals, said indicia having predetermined width lengthwise of the tape equal in width to the beams to which the tape is to be secured to align the beams with respective color indicia whereby to center the beam on the respective increment, said tape having nailing holes centered on said increments for admitting nails therethrough to secure the tape to the beams for holding the beams, said tape having an initial foot length with nail holes spaced at inch intervals, and said indicia being repeated at regular intervals, certain of the intervals identified by a first color, other intervals by a second color and further intervals by a third color and overlapping intervals being identified by all colors arranged as bars elongated lengthwise of the tape and of a width equal to the width of the beams to which the tape is to be applied, said tape having a leading end portion having a flange coplanar with the tape and of a width substantially equal to the width of a beam to which it is applied and having a zero mark at its free end and having a one inch mark between its edges spaced lengthwise of the tape and having nail holes located between the inch mark and the zero mark; said end portion having another flange for laying against the outside of the first beam to which said leading end of the tape is applied.

References Cited by the Examiner

UNITED STATES PATENTS

| | | | |
|---|---|---|---|
| 1,145,244 | 7/15 | Hoffmann | 33—137 X |
| 1,776,245 | 9/30 | Barrett | 33—111 |
| 1,828,078 | 10/31 | Sealey | 50—531 |
| 1,983,202 | 12/34 | Volz | 33—137 |
| 2,187,087 | 1/40 | Leary | 33—137 |
| 2,217,115 | 10/40 | Hermodsson | 50—531 |
| 2,575,077 | 11/51 | Snyder | 33—137 |
| 2,778,118 | 1/57 | Manville | 33—137 |
| 3,136,067 | 6/64 | Horner | 33—137 |

FOREIGN PATENTS

| | | |
|---|---|---|
| 6,316 | 11/11 | Great Britain. |
| 376,191 | 7/32 | Great Britain. |

ISAAC LISANN, *Primary Examiner.*